United States Patent [19]

Hanke

[11] 4,250,357
[45] Feb. 10, 1981

[54] FUSE MOUNTING

[75] Inventor: Kenneth E. Hanke, Atlanta, Ga.

[73] Assignee: Kearney-National, Inc., Atlanta, Ga.

[21] Appl. No.: 63,942

[22] Filed: Aug. 6, 1979

[51] Int. Cl.³ ............................................. H01H 9/22
[52] U.S. Cl. ................................. 200/50 A; 361/349; 361/360
[58] Field of Search ................. 200/50 R, 50 A, 50 B, 200/50 C, 50 AA; 361/331–363; 339/111, 252 R

[56] References Cited

U.S. PATENT DOCUMENTS

| | | | |
|---|---|---|---|
| 1,693,854 | 12/1928 | Minott | 361/357 |
| 1,826,370 | 10/1931 | Schwarz et al. | 200/50 A |
| 2,565,314 | 8/1951 | Lewis | 361/340 |
| 2,636,955 | 4/1953 | George | 200/50 A X |
| 3,917,374 | 11/1975 | Murdock | 339/111 |

Primary Examiner—J. V. Truhe
Assistant Examiner—Morris Ginsburg

Attorney, Agent, or Firm—Rodgers & Rodgers

[57] ABSTRACT

A fuse mounting arranged to isolate live electric parts and provided with grounded exposed parts comprises a housing structure, a hingedly mounted fuse panel disposed within said housing structure and normally forming a part of a fuse isolating wall within said housing structure, fuse mounting means secured to the interior of said fuse panel so as to isolate a fuse mounted on said fuse mounting means, conducting means in the form of an electric bushing and its associated bushing well mounted on and projecting through said fuse panel and forming a connection between one terminal of the fuse, disjointable connecting means in the form of an elbow connector engageable with said bushing on the exterior of said fuse panel and outside said isolating wall to form a disjointable electric connection with said bushing, and latch means movably mounted on said fuse panel and engageable with a locking slot formed in said isolating wall for removably securing said fuse panel in its normal position in said isolating wall.

16 Claims, 9 Drawing Figures

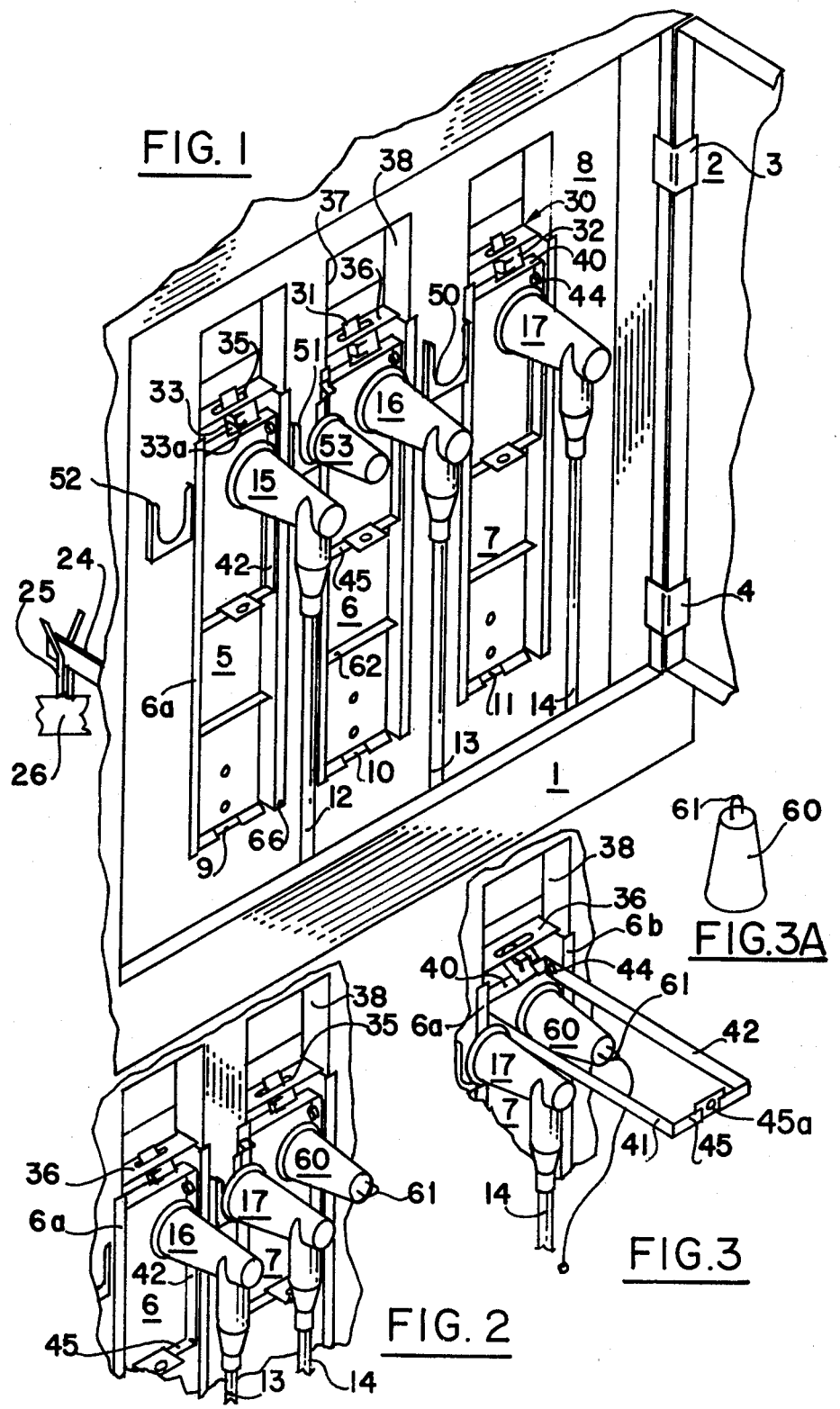

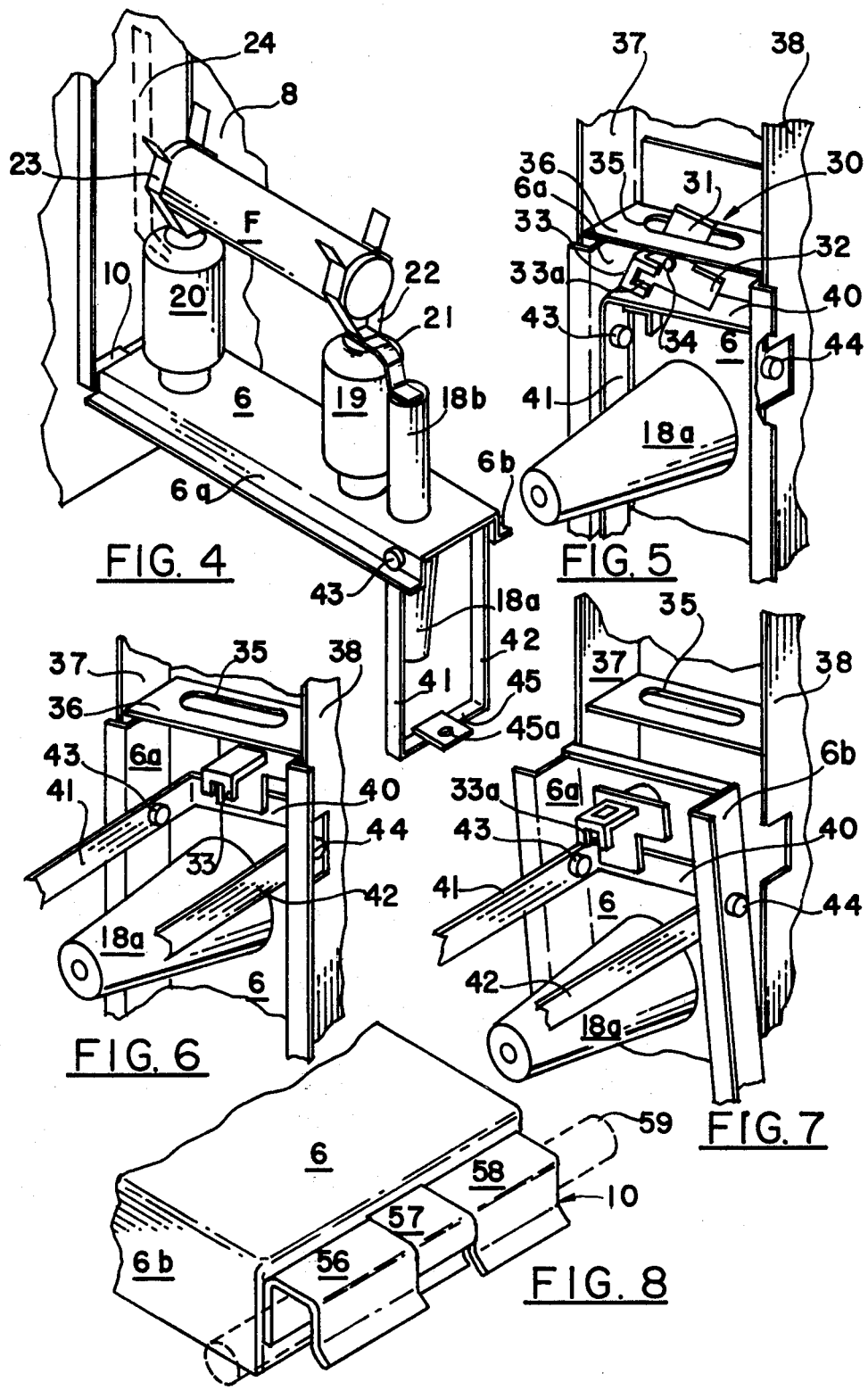

FUSE MOUNTING

TECHNICAL FIELD

This invention pertains to the distribution of electric power and more particularly provides means for isolating live electric parts from ready access by an operator and also provides an arrangement by which parts of the isolating structure to which an operator has access are effectively grounded. By this means safety conditions are substantially enhanced without impairing the ready accessibility by an operator to parts which require replacement such as spend electric fuses.

BACKGROUND ART

It is current practice to mount power fuses used in conjunction with power distribution circuits within a metal enclosure having hinged access doors. In such structures, fuses and other live electric components are mounted immediately behind the housing doors and thus constitute a hazard for an operator who might inadvertently come in contact with such live electric components.

DISCLOSURE OF INVENTION

According to this invention in one form, a fuse isolating wall is provided inside a metal housing structure and is located immediately behind the housing doors. Fuse panels are hingedly mounted to the isolating wall and constitute parts thereof so that a fuse mounted or fuse mounting insulating structure secured to the interior of each fuse panel is isolated from access by an operator so long as the panel is in its normal position forming a part of the insolating wall. Conducting means preferably in the form of a bushing having a conventional bushing well extends through the fuse panel and is interconnected with one terminal of the fuse on the inside of the fuse panel while a part of the conducting structure extends outside the fuse panel and is arranged for disjointable engagement with connecting means such as a circuit elbow connector. The fuse panel is held in its normal position as a part of an isolating wall by latch means and such latch means is held in its latching position by an interlock movably mounted on the fuse panel. Portions of the interlock operating lever are interposed between the fuse panel and the disjointable connector. It is therefore impossible to hinge the fuse panel out of its position forming a part of the isolating wall so long as the disjointable connecting means is in its circuit closing position on the exterior bushing. When it is desired to replace a fuse, the disjointable connecting means is removed from its associated conductor and temporarily stored on a parking stand mounted on the isolating wall. The interlock operating lever is then moved to its latch releasing position following which an operating rod is used to engage the latch and to rotate it to its unlatched condition. The fuse panel is then swung out of its position as a part of the isolating wall and may then be removed therefrom to a convenient location for the replacement of the fuse. Thereafter the procedure is reversed to reinsert the replacement fuse into the circuit.

BRIEF DESCRIPTION OF THE DRAWINGS

In the drawings

FIG. 1 is an isometric view of an isolating panel together with hingedly mounted fuse panels and associated structure formed according to this invention;

FIG. 2 is a fragmentary view of a part of FIG. 1 and which shows one elbow type connecting means disconnected from its associated conducting means and with the associated fuse panel in its latched position;

FIG. 3 is a view similar to FIG. 2 but which shows the interlock in its latch releasing position;

FIG. 3A is an isometric view of a protective receptacle used for mounting on a bushing once the connecting elbow is disconnected therefrom;

FIG. 4 is an isometric view showing one fuse panel in the position which it occupies after having been swung outwardly from the isolating wall so as to expose the associated fuse;

FIG. 5 is an enlarged isometric view somewhat similar to FIGS. 2 and 3 and which shows the latch means and associated interlock in fuse panel latching positions;

FIG. 6 is a view similar to FIG. 5 but which shows the latch interlock in latch releasing position;

FIG. 7 is a view similar to FIGS. 5 and 6 and which shows the fuse panel during the initial stages of movement from the position shown for example in FIGS. 1, 2 and 3 toward the horizontal position represented by FIG. 4; and FIG. 8 is an enlarged isometric view of the disjointable hinge structure disposed at the bottom of the fuse panel and by which the fuse panel is hingedly mounted to the isolating wall.

BEST MODE OF CARRYING OUT THE INVENTION

With reference to FIG. 1 the numeral 1 denotes housing structure to which access door 2 is hingedly mounted by hinges 3 and 4. FIG. 1 discloses a fragment only of the housing structure. Thus it is probable that another door such as door 2 forms a part of the housing, such door not being shown.

Disposed within the housing 1 and immediately behind the door 2 when closed, are a plurality of fuse panels designated by the numerals 5, 6 and 7 which are hingedly mounted to isolating wall 8 fixed in position within the housing 1. Panels 5, 6 and 7 are hinged to isolating wall 8 by disjointable hinge structures 9, 10 and 11.

Insulated conductors 12, 13 and 14 are interconnected in conventional fashion with disjointable connectors 15, 16 and 17 respectively which may take the form of conventional elbows. These elbows cooperate in known manner with conventional bushings mounted on and extending through fuse panels 5, 6 and 7 one of which is observable in FIG. 4 and designated by the numeral 18a.

As is apparent from FIG. 4 fuse mounting means in the form of insulators 19 and 20 are secured to the back of fuse panel 6 and the conducting structure disposed within conducting means in the form of bushing 18a having a conventional bushing well 18b is interconnected as indicated at 21 with terminal structure 22 which cooperates with one terminal of fuse F. The other terminal of fuse F cooperates with terminal 23 mounted on insulator 20. A switch blade 24 is mounted on insulator 20 and is electrically connected with terminal 23. This blade cooperates with a fixed jaw contact 25 shown schematically in FIG. 1 and which is mounted on an insulator 26 secured in fixed position within the housing 1.

During closed circuit conditions, the blade 24 is in cooperative closed position with the fixed contact 25. Blade 24 in turn is connected through terminal structure 23, fuse F, terminal structure 22 and connecting means 21, bushing 18a and elbow 16 with the conductor 13.

Since the housing 1, the access doors 2, as well as the isolating wall 8 are all grounded as are the sheaths of conductors 12, 13 and 14 and of the connectors 15, 16 and 17 and because the hinges 9, 10 and 11 are formed in part of unpainted elements mounted on the isolating wall 8, it is clear that the components as viewed in FIG. 1 constitute an electrically grounded structure and thus are safe even though access to all of these parts is freely available to an operator once the door 2 is opened.

Since all of the fuse panels such as 5, 6 and 7 are of identical construction and because the parts which cooperate therewith are identical, only one fuse panel such as 6 is here described in detail.

As is best shown in FIGS. 5, 6 and 7, the fuse panel 6 is provided with latch means generally designated by the numeral 30. Latch means 30 comprises a latch arm 31, an abutment arm 32 integrally formed with latch arm 31 together with operating arm 33 which is secured to the L-shaped structure comprising latch arm 31 and abutment arm 32. All of this structure is rotatably mounted on fixed pin 34 which in turn is secured to the fuse panel 6 near the upper part thereof.

For cooperating with latch means 30, a latching slot 35 is formed in a horizontal plate 36 secured to the sides 37 and 38 of fuse panel receiving openings formed in isolating wall 8.

With the latch arm 31 disposed within the latching slot 35 as shown in FIG. 5, fuse panel 6 is securely held in its normal position forming a part of isolating wall 8. When the latch arm 31 is rotated in a clockwise direction as viewed in FIGS. 6 and 7, the latch arm 31 moves out of the latching slot 35 to an unlatched condition as represented by FIG. 6. When the latch is unlatched as represented in FIG. 6, the fuse panel 6 may then be hinged outwardly as represented in FIG. 7 in which the fuse panel is shown during the initial stages of its outward swinging movement about hinge 10.

The latch 30 is rotated about fixed pin 34 by a suitable operating rod such as a conventional clamp stick which engages the slot 33a in operating arm 33 and which thus enables an operator to rotate the latch means 30 in a clockwise direction from the position represented in FIG. 5 to that shown in FIGS. 6 and 7.

In order to prevent inadvertent or accidental unlatching of the latch means 31, interlock structure is provided which includes an abutment bar 40 secured at its ends to a pair of levers 41 and 42 which are pivotally mounted on pins 43 and 44 secured to the flanged side panels 6a and 6b of the fuse panel 6. As is apparent in FIG. 4, the levers 41 and 42 are interconnected at their lower ends by a cross bar 45 having hole 45a.

With the fuse panel 6 mounted as shown in FIG. 1 and with the operating arms 41 and 42 vertically disposed as shown for example in FIGS. 1, 2 and 5, abutment bar 40 is disposed immediately below the abutment arm 32 of latch means 30. Thus with the parts in the positions represented in FIGS. 1, 2 and 5, latch means 31 cannot be rotated due to the position of abutment bar 40. In order to release the latch for unlatching rotation in a clockwise direction, it is necessary to move the abutment bar 40 out of its interlocking position as shown in FIGS. 1, 2 and 5. From FIG. 1 it is apparent that cross bar 45 cannot be swung to its outer horizontal position as shown in FIG. 3 so long as conductor 13 and connector 16 are disposed in their closed circuit positions as represented for example in FIGS. 1 and 2. Thus the fuse panel 6 is firmly locked in place as a part of isolating wall 8 so long as the connector 16 is mounted on its associated bushing 18a and the structure is electrically grounded and is safe with no exposed live parts.

When it is desired to disconnect one of the connectors such as 16 from its bushing such as 18a, it is desirable to provide means for supporting the connector and its associated conductor. Toward this end parking stands 50, 51 and 52 are secured to isolating wall 8 and a standoff plug such as is indicated at 53 in FIG. 1 is provided. Thus the standoff plug such as 53 is mounted on a parking stand such as 51 where it constitutes a structure similar in appearance to a bushing such as bushing 18a. Thus removal or disconnection of elbow connector 16 from bushing 18a may readily be followed by the mounting of elbow 16 on the standoff plug 53. The removal of elbow 16 is possible if the circuit is de-energized or if elbow 16 and bushing 18a are provided with interrupting structure. In either event the standoff plug 53 affords a ready support on which the connector such as 16 may be removably mounted for temporary storage. After this procedure is completed, the hole 45a in cross bar 45 is engaged with a clampstick and pulled outwardly so as to swing the levers 41 and 42 from the position shown for example in FIGS. 1, 2, and 5 to the position shown for example in FIG. 3. This movement causes the abutment bar 40 to swing into a vertical plane and behind the latch means 30. A clampstick then is employed to engage the slot 33a in the operating arm 33 after which the operating arm 33 is rotated in a clockwise direction so as to move the latch means 30 to a releasing position with latch arm 31 out of slot 35 as shown for example in FIGS. 6 and 7. Thereafter outward movement of the fuse panel 6 about its hinge 10 may be effected by simply grasping the operating arm 33 with a clampstick to swing the panel 6 into the horizontal position represented in FIG. 4. This action of course disconnects the switch blade 24 from the fixed switch contact 25 and completely isolates the fuse F. Under these conditions a replacement fuse may be substituted for the fuse F or if desired the fuse panel 6 together with the interlock structure may be completely removed from the enclosing housing structure 1 because the hinge 10 as best shown in FIG. 8 comprises generally U-shaped clamps 56, 57 and 58 which cooperate with rod 59 which forms a part of fuse panel 6. Rod 59 is simply secured at its ends to vertical panels 37 and 38 of isolating wall 8. Since the U-shaped structure 57 is of spring material, it is obvious that it may simply be disengaged from the rod 59 under which conditions the fuse panel 6 and structure associated therewith as best shown in FIG. 4 may be removed entirely from the housing 1.

Once the replacement fuse is in place on the face panel, and with the fuse panel 6 hinged at 10 to the isolating wall 8, it is simply necessary then to swing the panel 6 from the position shown in FIG. 4 to a vertical position as shown for example in FIG. 3 in order to insert the replacement fuse into the circuit. At this stage, the abutment arm 33 holds the abutment bar 40 in the position shown in FIG. 6 in which position the abutment bar 40 and its levers 41, 42 and the cross bar 45 serve to prevent the operator from placing elbow 16 in place on bushing 18a. By this means the bushing 18a and other parts cannot be energized until the latch means 30 is latched and the parts 41, 42 and 45 moved to the positions shown in FIG. 5. Thereafter the interlock 33 is engaged by a clampstick and the latch rotated in a counterclockwise direction into the position shown for example in FIG. 5. The cross bar 45 is then engaged and swung downwardly in a clockwise direction as viewed for example in FIG. 3 to occupy the position shown for example in FIG. 5. When so positioned, the abutment bar 40 of the interlock structure prevents the latch means 30 from rotating out of its latched position as shown for example in FIG. 5. Thereafter the connector 16 is removed from its standoff plug 53 and remounted on the bushing 18a and the circuit is once again complete as represented in FIG. 1.

In order to preclude inadvertent contact with a bushing such for example as bushing 18a after the connector 16 is disconnected therefrom, the bushing 18a is enveloped by structure such as that indicated in FIG. 3 and in FIG. 3A and designated by the numeral 60. This structure simply is of insulating material with a conductive sheath on its exerior surface. Thus a connecting wire from the bracket 61 which is in electric contact with the sheath of receptacle 60 is simply grounded to the grounding bar 62 which is interconnected at its ends with the side panels 6a and 6b of the fuse panel 6. Thus the bushing is completely isolated and rendered safe after the connector 16 is disconnected from bushing 18a. Furthermore, receptacle 60 on its inner surface is provided with a water tight seal which cooperates with the exterior surface of bushing 18a.

Ordinarily only one standoff plug such as 53 is required for one housing structure such as 1 and such standoff plug is arranged for removable mounting on either the parking stands such as 50, 51 or 52 as may be desired.

INDUSTRIAL APPLICABILITY

By this invention safety of distribution circuits is greatly enhanced. The invention is particularly well suited to enhance the safety of the lineman after the doors 2 are opened since all of the structure to which he has access is safely grounded.

I claim:

1. A fuse mounting comprising a housing, a hingedly mounted fuse panel disposed within said housing and normally forming a part of a fuse isolating wall within said housing, fuse mounting means secured to the interior of said fuse panel, conducting means secured to and extending through said fuse panel and arranged for connection with one terminal of a fuse mounted on said fuse mounting means, disjointable connecting means exteriorly of said isolating wall engageable with a part of said conducting means on the exterior of said fuse panel for forming a removable electric connection therewith, and movable latch means for holding said fuse panel in its normal position.

2. A fuse mounting according to claim 1 wherein a movable interlock having a latching and a releasing position is arranged to hold said latch means in its fuse panel latching position when in its latching position.

3. A fuse mounting according to claim 2 wherein a part of said interlock is interposed between said fuse panel and a part of said disjointable connecting means when said disjointable connecting means is in engagement with said part of said conducting means so as to prevent said interlock from releasing said latch means.

4. A fuse mounting according to claim 1 wherein said latch means comprises a latch arm rotatably mounted on said fuse panel and a latching slot formed in a part of said fuse isolating wall.

5. A fuse mounting according to claim 2 wherein said latch means comprises an abutment arm engageable with a part of said interlock when said interlock is disposed in its latch securing position.

6. A fuse mounting according to claim 1 wherein said latch means comprises an operating arm arranged for disjointable coupling with a manually operable clampstick.

7. A fuse mounting according to claim 2 wherein said interlock comprises an abutment bar pivotally mounted on said fuse panel and a lever connected with said abutment bar for imparting movement thereto between its holding and releasing positions.

8. A fuse mounting according to claim 1 wherein a stand-off plug is mounted on the exterior of said isolating wall and arranged to engage and support said disjointable connecting means when such connecting means is disconncted from said conducting means.

9. A fuse mounting according to claim 8 wherein said stand-off plug is movably mounted on a parking stand secured to the exterior of said isolating wall.

10. A fuse mounting according to claim 1 wherein an insulating receptacle having a grounded conducting sheath is arranged for removable mounting on said conducting means when said connecting means is disconnected therefrom.

11. A fuse mounting according to claim 10 wherein said receptacle electrically insulates and water seals said conducting means.

12. A fuse mounting according to claim 10 wherein said receptacle sheath is electrically grounded to said fuse panel.

13. A fuse mounting according to claim 7 wherein said lever is manually operable with a clampstick to swing said fuse panel about its hinged mounting and relative to said isolating wall when said latch means is unlatched.

14. A fuse mounting according to claim 1 wherein said fuse panel is disjointably mounted on said isolating wall.

15. A fuse mounting according to claim 1 wherein a switch contact is mounted on said fuse mounting means and interconnected with the other terminal of said fuse for engaging a fixed contact mounted on a part of said housing when said fuse panel is disposed in its normal position in said isolating wall.

16. A fuse mounting according to claim 2 wherein said latch means is arranged to hold said interlock in its releasing position when said latch means is in its releasing position thereby to prevent energization of said conducting means by said disjointable connecting means.

* * * * *